US005646103A

United States Patent [19]
Kottwitz et al.

[11] Patent Number: 5,646,103
[45] Date of Patent: Jul. 8, 1997

[54] BUILDER FOR DETERGENTS OR CLEANING COMPOSITIONS

[75] Inventors: Beatrix Kottwitz; Joerg Poethkow, both of Duesseldorf; Peter Krings, Krefeld; Horst Upadek, Ratingen, all of Germany

[73] Assignee: Henkel Kommanditgesellschaft auf Aktien, Duesseldorf, Germany

[21] Appl. No.: 495,639

[22] PCT Filed: Jan. 27, 1994

[86] PCT No.: PCT/EP94/00228

§ 371 Date: Sep. 15, 1995

§ 102(e) Date: Sep. 15, 1995

[87] PCT Pub. No.: WO94/18295

PCT Pub. Date: Aug. 18, 1994

[30] Foreign Application Priority Data

Feb. 5, 1993 [DE] Germany .................. 43 03 448.9

[51] Int. Cl.$^6$ ................ C11D 3/37; C11D 3/22; C11D 1/12
[52] U.S. Cl. .............. 510/361; 510/108; 510/230; 510/470; 510/477; 510/495; 510/507; 510/509; 510/531; 510/532; 510/533
[58] Field of Search ............ 252/174.23, 174.17, 252/174.25, 174.14, DIG. 2; 527/314; 510/108, 230, 361, 531, 532, 533, 470, 477, 495, 507, 509

[56] References Cited

U.S. PATENT DOCUMENTS

| 4,897,215 | 1/1990 | Trieselt et al. ............... 252/174.24 |
| 4,897,220 | 1/1990 | Trieselt et al. ............... 252/546 |
| 4,925,905 | 5/1990 | Boeckh et al. ............... 526/208 |
| 5,126,069 | 6/1992 | Kud et al. ............... 252/174.23 |
| 5,227,446 | 7/1993 | Denzinger et al. ............... 527/314 |
| 5,268,437 | 12/1993 | Holy et al. ............... 526/229 |

FOREIGN PATENT DOCUMENTS

| 0164514 | 12/1985 | European Pat. Off. . |
| 0337259 | 10/1989 | European Pat. Off. . |
| 0525239 | 2/1993 | European Pat. Off. . |
| 4124701 | 1/1993 | Germany . |
| 4203031 | 8/1993 | Germany . |
| 4221381 | 2/1994 | Germany . |
| 58-217598 | 12/1983 | Japan . |
| 9013533 | 11/1990 | WIPO . |
| 9108171 | 6/1991 | WIPO . |
| 9109009 | 6/1991 | WIPO . |
| 9401476 | 1/1994 | WIPO . |

*Primary Examiner*—Douglas J. McGinty
*Assistant Examiner*—Lorna M. Douyon
*Attorney, Agent, or Firm*—Ernest G. Szoke; Wayne C. Jaeschke; Henry E. Millson, Jr.

[57] ABSTRACT

A detergent or cleaning composition containing a copolymeric polycarboxylic acid or salt thereof which is a terpolymer of (a) a monoethylenically unsaturated $C_{3-8}$ carboxylic acid, (b) a 2-alkyl or aryl allylsulfonic acid, and (c) a carbohydrate. The invention also relates to builder compositions containing the above terpolymer.

16 Claims, No Drawings

BUILDER FOR DETERGENTS OR CLEANING COMPOSITIONS

BACKGROUND OF THE INVENTION

1. Field of the Invention

This invention relates to a detergent or cleaning composition containing degradable polymeric polycarboxylates as incrustation inhibitors, to a builder for detergents or cleaning compositions and to processes for the production of the detergent or cleaning composition and the builder.

2. Statement of Related Art

In practice, polymeric polycarboxylates based on homopolymeric and copolymeric acrylic acid or maleic acid or salts thereof are generally used as incrustation inhibitors. Copolymeric salts produced solely from the monomers (meth)acrylic acid and/or maleic acid are particularly preferred in this regard. Unfortunately, a disadvantage of these polymers is that they are not readily biodegradable.

DESCRIPTION OF THE INVENTION

Accordingly, the problem addressed by the present invention was to provide detergents showing both high primary washing power and high secondary washing power in which biologically degradable polymers would be present as incrustation inhibitors.

Accordingly, the present invention relates to a detergent or cleaning composition, more particularly a laundry detergent, containing (co)polymeric polycarboxylic acids and/or polycarboxylates, characterized in that it contains a terpolymer of the monomers of a monoethylenically unsaturated $C_{3-8}$ carboxylic acid, a 2-alkyl allylsulfonic acid or 2-aryl allylsulfonic acid and a carbohydrate and/or the salts of a monoethylenically unsaturated $C_{3-8}$ carboxylic acid and of a 2-alkyl allylsulfonic acid or 2-aryl allylsulfonic acid and a carbohydrate as the copolymeric polycarboxylic acid and/or copolymeric polycarboxylate.

The terpolymers used in accordance with the invention contain two carboxylic acids and/or salts thereof and a carbohydrate as monomers. The first acidic monomer or salt is derived from a monoethylenically unsaturated $C_{3-8}$ monocarboxylic acid and preferably from a $C_{3-4}$ monocarboxylic acid, more particularly from (meth)acrylic acid. The second acidic monomer or salt is a derivative of an allylsulfonic acid substituted in the 2-position by an alkyl radical, preferably a $C_{1-4}$ alkyl radical, or by an aromatic radical preferably derived from benzene or benzene derivatives. Preferred terpolymers contain 40 to 60% by weight and, more particularly, 45 to 55% by weight of (meth)acrylic acid or (meth)acrylate, more preferably acrylic acid or acrylate, 10 to 30% by weight and preferably 15 to 25% by weight of methallylsulfonic acid or methallyl sulfonate and, as the third monomer, 15 to 40% by weight and preferably 20 to 40% by weight of a carbohydrate. This carbohydrate may be, for example, a mono- di-, oligo- or polysaccharide, mono-, di- or oligosaccharides being preferred. Through the use of this third monomer, weak spots are incorporated in the polymer and are responsible for its biological degradability. Sucrose is particularly preferred as the third monomer. The terpolymers used in accordance with the invention may be produced by any of the known processes.

More particularly, the monomeric acids are reacted with the carbohydrate, after which the acids are optionally neutralized, preferably to their alkali metal salts, such as the sodium or potassium salts, or ammonium salts or alkanolamine salts, such as the monoethanolamine salt or the triethanolamine salt.

Similarly to the known (co)polymeric polycarboxylic acids or polycarboxylates, such as the homopolymeric or copolymeric acrylic acids or acrylates, preferred terpolymers are also those of which all or at least part and, more particularly, more than 50%, based on the carboxyl groups present, are neutralized. A completely neutralized terpolymer, i.e. a terpolymer consisting of the salts of the monomeric acids, more particularly the sodium or potassium salts of the monomeric acids, and a carbohydrate is particularly preferred. The terpolymers generally have a relative molecular weight in the range from 1,000 to 200,000, preferably in the range from 2,000 to 50,000 and more particularly in the range from 3,000 to 10,000. They are generally used in the form of aqueous solutions and preferably in the form of 30 to 50% by weight aqueous solutions. Particularly preferred terpolymers are produced by the process described in earlier German patent application P 42 21 381.9.

Detergents or cleaning compositions according to the invention preferably contain the terpolymer in quantities of 0.5 to 30% by weight and more preferably in quantities of 2 to 25% by weight. Besides the terpolymers, the detergents or cleaning compositions preferably contain one or more ingredients from the group of alkaline inorganic salts and builders typically used in detergents or cleaning compositions.

The alkaline inorganic salts include water-soluble bicarbonates, carbonates, amorphous silicates or mixtures thereof. Alkali metal carbonate and alkali metal silicate, above all sodium silicate with a molar ratio of $Na_2O$ to $SiO_2$ of 1:1 to 1:4.5 and preferably 1:2 to 1:3.5, are particularly suitable. The sodium carbonate content of the detergents or cleaning compositions may be from 0 to around 20% by weight while their sodium silicate content is generally from 0 to around 10% by weight.

Known builders typically used in detergents or cleaning compositions include, above all, phosphates, zeolites and layer silicates, zeolites and crystalline layer silicates being preferred. The finely crystalline, synthetic zeolite containing bound water used in accordance with the invention is preferably zeolite NaA of detergent quality. However, zeolite NaX and mixtures of A, X and/or P are also suitable. The zeolite may be used in the form of a spray-dried powder or even in the form of an undried stabilized suspension still moist from its production. In cases where the zeolite is used in the form of a suspension, the suspension may contain small additions of nonionic surfactants as stabilizers, for example 1 to 3% by weight, based on zeolite, of ethoxylated $C_{12-18}$ fatty alcohols containing 2 to 5 ethylene oxide groups, $C_{12-14}$ fatty alcohols containing 4 to 5 ethylene oxide groups or ethoxylated isotridecanols. Suitable zeolites have an average particle size of less than 10 μm (volume distribution, as measured by the Coulter Counter method) and preferably contain 18 to 22% by weight and, more particularly, 20 to 22% by weight of bound water. Quantitative data relating to zeolite always relate to the water-containing zeolite, unless otherwise indicated.

Suitable substitutes or partial substitutes for phosphates and zeolites are crystalline layer-form sodium silicates corresponding to general formula (I) $NaMSi_xO_{2x+1} \cdot yH_2O$, where M is sodium or hydrogen, x is a number of 1.9 to 4 and y is a number of 0 to 20, preferred values for x being 2, 3 or 4. Corresponding crystalline layer silicates are described, for example, in EP-A-0 164 514. Preferred crystalline layer silicates corresponding to general formula (I) are those in which M is sodium and x has a value of 2 or 3. Both β- and δ-sodium disilicates $Na_2Si_2O_5 \cdot yH_2O$ are particularly preferred, β-sodium disilicate being obtainable, for example, by the process described in International patent application WO-A-91/08171.

The detergents or cleaning compositions according to the invention preferably contain water-containing zeolite and/or crystalline layer silicates in quantities of 10 to 65% by weight.

Suitable organic builders are, for example, the polycarboxylic acids preferably used in the form of their sodium salts, such as citric acid, adipic acid, succinic acid, glutaric acid, tartaric acid, sugar acids, aminocarboxylic acids, nitrilotriacetic acid, (NTA), providing its use is not ecologically objectionable, and mixtures thereof. Preferred salts are the salts of the polycarboxylic acids, such as citric acid, adipic acid, succinic acid, glutaric acid, tartaric acid, sugar acids and mixtures thereof. Their content in the detergents or cleaning compositions is preferably 0 to 20% by weight.

In one preferred embodiment of the invention, the detergents or cleaning compositions contain 0.5 to 30% by weight and preferably 2 to 25% by weight of terpolymer, 0 to 20% by weight and preferably 5 to 15% by weight of inorganic carbonates and and 0 to 20% by weight and preferably 5 to 15% by weight of salts of organic polycarboxylic acids.

In another preferred embodiment of the invention, the detergents or cleaning compositions contain 10 to 65% by weight of water-containing zeolite and/or crystalline layer silicates and 2 to 20% by weight of terpolymer of the salts of acrylic acid and of 2-methallylsulfonic acid and sucrose.

In another preferred embodiment of the invention, the detergents or cleaning compositions contain 20 to 40% by weight of zeolite and/or crystalline layer silicates, 5 to 15% by weight of sodium carbonate, 0 to 10% by weight and preferably 2 to 5% by weight of amorphous silicates and 3 to 15% by weight of terpolymer.

In another preferred embodiment of the invention, the detergents or cleaning compositions contain terpolymer and salts of organic polycarboxylic acids in a ratio of 1:4 to 4:1.

In addition to the terpolymer, the detergents or cleaning compositions according to the invention may contain typical known (co)polymeric polycarboxylates. Suitable polymeric polycarboxylates are, for example, the sodium salts of polyacrylic acid or polymethacrylic acid, for example those with a relative molecular weight of 800 to 150,000 (based on acid). Suitable copolymeric polycarboxylates are, in particular, those of acrylic acid with methacrylic acid and of acrylic acid or methacrylic acid with maleic acid. Copolymers of acrylic acid with maleic acid containing 50 to 90% by weight of acrylic acid and 50 to 10% by weight of maleic acid have proved to be particularly suitable. Their relative molecular weight, based on free acids, is generally in the range from 5,000 to 200,000, preferably in the range from 10,000 to 120,000 and more preferably in the range from 50,000 to 100,000, commercial products such as Sokalan CP5® or Alcosperse® advantageously being used. Detergents or cleaning compositions containing the terpolymer and typical homopolymeric or copolymeric acrylates in a ratio by weight of 2:3 to 3:2 are preferred. However, the detergents or cleaning compositions should preferably contain no more than 2% by weight of the typical homopolymeric or copolymeric acrylates.

The detergents or cleaning compositions according to the invention, which may be present in solid, granular or liquid to paste-like form, contain anionic, nonionic, amphoteric and/or cationic surfactants, more particularly in quantities of 10 to 40% by weight, as other typical ingredients.

The anionic surfactants used are, for example, those of the sulfonate and sulfate type. Preferred surfactants of the sulfonate type are $C_{9-13}$ alkyl benzene sulfonates, olefin sulfonates, i.e. mixtures of alkene and hydroxyalkane sulfonates, and also the disulfonates obtained, for example, from $C_{12-18}$ monoolefins with a terminal or internal double bond by sulfonation with gaseous sulfur trioxide and subsequent alkaline or acidic hydrolysis of the sulfonation products. Alkanesulfonates obtained from $C_{12-18}$ alkanes, for example by sulfochlorination or sulfoxidation and subsequent hydrolysis or neutralization, are also suitable. In their case, the sulfonate group is statistically distributed over the entire carbon chain, the secondary alkanesulfonates predominating.

The esters of α-sulfofatty acids (ester sulfonates), for example the α-sulfonated methyl esters of hydrogenated coconut oil, palm kernel oil or tallow fatty acids, are also suitable. Esters of α-sulfofatty acids (ester sulfonates) obtained by α-sulfonation of the methyl esters of fatty acids of vegetable and/or animal origin containing 8 to 20 carbon atoms in the fatty acid molecule and subsequent neutralization to water-soluble monosalts are particularly suitable. The esters in question are preferably the α-sulfonated esters of hydrogenated coconut oil, palm kernel oil or tallow fatty acids; sulfonation products of unsaturated fatty acids, for example oleic acid, may also be present in small quantities, preferably in quantities of not more than about 2 to 3% by weight. α-Sulfofatty acid alkyl esters with an alkyl chain or not more than 4 carbon atoms in the ester group, for example methyl esters, ethyl esters, propyl esters and butyl esters, are particularly preferred. The methyl esters of α-sulfofatty acids (MES) are used with particular advantage. Other suitable anionic surfactants are the α-sulfofatty acids obtainable by ester cleavage of the α-sulfofatty acid alkyl esters and disalts thereof. In their production on an industrial scale, the monosalts of the α-sulfofatty acid alkyl esters are actually obtained in the form of a water-containing mixture with limited quantities of disalts.

The disalt content of such surfactants is normally below 50% by weight, based on the anionic surfactant mixture, for example up to about 30% by weight. In the context of the invention, the quantities mentioned with regard to the α-sulfofatty acid alkyl esters are always the sum total of the quantities of α-sulfofatty acid alkyl ester monosalt and the corresponding α-sulfofatty acid disalt. Mixtures of monosalts and disalts with other surfactants, for example with alkyl benzene sulfonates, are also preferred.

Other suitable anionic surfactants are sulfonated fatty acid glycerol esters. Fatty acid glycerol esters are understood to be the mono-, di- and triesters and mixtures thereof which are obtained where production is carried out by esterification of a monoglycerol with 1 to 3 moles of fatty acid or in the transesterification of triglycerides with 0.3 to 2 moles of glycerol. Preferred sulfonated fatty acid glycerol esters are the sulfonation products of saturated $C_{6-22}$ fatty acids, for example caproic acid, caprylic acid, capric acid, myristic acid, lauric acid, palmitic acid, stearic acid or behenic acid. Where fats and oils, i.e. natural mixtures of different fatty acid glycerol esters, are used as starting materials, they have to be largely saturated with hydrogen in known manner before the sulfonation process, i.e. hydrogenated to iodine values below 5 and preferably below 2. Typical examples of suitable starting materials are palm oil, palm kernel oil, palm stearin, olive oil, rapeseed oil, coriander oil, sunflower oil, cottonseed oil, peanut oil, linseed oil, lard oil or lard. However, it has proved to be of particular advantage to use coconut oil, palm kernel oil or beef tallow as starting materials by virtue of their high natural content of saturated fatty acids. The sulfonation of the $C_{6-22}$ fatty acids or the mixtures of fatty acid glycerol esters with iodine values below 5 containing $C_{6-22}$ fatty acids is preferably carried out by reaction with gaseous sulfur trioxide and subsequent neutralization with aqueous bases, as described in International patent application WO-A-91/09009.

The sulfonation products are a complex mixture containing mono-, di- and triglyceride sulfonates with a sulfonic acid group in the α-position and/or an internal sulfonic acid group. Sulfonated fatty acid salts, glyceride sulfates, glycerol sulfates, glycerol and soaps are formed as secondary products. If saturated fatty acids or hydrogenated fatty acid glycerol ester mixtures are used as starting materials for the sulfonation reaction, the percentage content of α-sulfonated fatty acid disalts may readily be up to about 60% by weight, depending on how the process is carried out.

Suitable surfactants of the sulfate type are the sulfuric acid monoesters of primary alcohols of natural and synthetic origin, more particularly of fatty alcohols, for example coconut oil fatty alcohol, tallow fatty alcohol, oleyl alcohol, lauryl, myristyl, cetyl or stearyl alcohol, or of $C_{10-20}$ oxoalcohols and the semi-esters of secondary alcohols with the same chain length. The fatty alcohol mixtures obtained from coconut oil, palm oil and palm kernel oil, which may additionally contain unsaturated alcohols, for example oleyl alcohol, are particularly preferred. The sulfuric acid monoesters of alcohols ethoxylated with 1 to 6 moles of ethylene oxide, such as 2-methyl-branched $C_{9-11}$ alcohols containing on average 3.5 moles of ethylene oxide, are also suitable.

Other preferred anionic surfactants are the salts of alkyl sulfosuccinic acid, which are also known as sulfosuccinates or as sulfosuccinic acid esters and which represent the monoesters and/or diesters of sulfosuccinic acid with alcohols, preferably fatty alcohols and, more particularly, ethoxylated fatty alcohols. Preferred sulfosuccinates contain $C_{8-18}$ fatty alcohol radicals or mixtures thereof. Particularly preferred sulfosuccinates contain a fatty alcohol radical derived from ethoxylated fatty alcohols which, considered in isolation, represent nonionic surfactants (for a description, see below). Sulfosuccinates of which the fatty alcohol radicals are derived from narrow-range ethoxylated fatty alcohols are particularly preferred. Alk(en)yl succinic acid preferably containing 8 to 18 carbon atoms in the alk(en)yl chain or salts thereof may also be used.

Preferred anionic surfactant mixtures contain combinations of fatty alcohol sulfates, sulfonated fatty acid glycerol esters, alkyl benzene sulfonates, α-sulfofatty acid methyl esters and/or sulfosuccinates. Particularly preferred mixtures contain as anionic surfactants fatty alcohol sulfates, more especially mixtures of short-chain saturated $C_{12-18}$ fatty alcohol sulfates with small amounts of $C_{18}$ and unsaturated fatty alcohol sulfates, more particularly oleyl sulfate, and mixtures of fatty alcohol sulfates and sulfonated fatty acid glycerol esters, fatty alcohol sulfates and alkyl benzene sulfonates, fatty alcohol sulfates and sulfosuccinates or alkyl benzene sulfonates and sulfosuccinates in any ratio.

The detergents or cleaning compositions may contain soaps as further ingredients. Suitable soaps are saturated fatty acid soaps, such as the salts of lauric acid, myristic acid, palmitic acid or stearic acid, and soap mixtures derived in particular from natural fatty acids, for example coconut oil fatty acid, palm kernel oil fatty acid or tallow fatty acid. Soap mixtures of which 50 to 100% by weight consist of saturated $C_{12-18}$ fatty acid soaps and 0 to 50% by weight of oleic acid soap are particularly preferred.

The anionic surfactants and the soaps may be present in the form of their sodium, potassium or ammonium salts and in the form of soluble salts of organic bases, such as mono-, di- or triethanolamine. The anionic surfactants are preferably present in the form of their sodium or potassium salts, more particularly in the form of their sodium salts.

Preferred nonionic surfactants are alkoxylated, more particularly ethoxylated, alcohols derived from primary alcohols preferably containing 9 to 18 carbon atoms and, on average, 1 to 12 moles of ethylene oxide (EO), in which the alcohol radical may be linear or 2-methyl-branched or may contain linear and methyl-branched radicals in the form of the mixtures typically present in oxoalcohol radicals. However, linear radicals of alcohols of native origin containing 12 to 18 carbon atoms, for example of cocoalcohol, tallow fatty alcohol or oleyl alcohol, are particularly preferred. Alcohol ethoxylates containing an average of 2 to 8 EO are particularly preferred. Preferred nonionic surfactants include ethoxylated fatty alcohols, such as $C_{12-14}$ alcohols containing 3 EO or 4 EO, $C_{9-11}$ alcohol containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO. The degrees of ethoxylation mentioned are statistical mean values which may be a whole number or broken number for a particular product. Preferred alcohol ethoxylates have a narrow homolog distribution (narrow-range ethoxylates, NRE).

Other nonionic surfactants which may be used in accordance with the invention are alkyl glycosides corresponding to the general formula RO(G)x, in which R is a primary, linear or methyl-branched, more particularly 2-methyl-branched, aliphatic radical containing 8 to 22 and preferably 12 to 18 carbon atoms and G stands for a glycose unit containing 5 or 6 carbon atoms, preferably glucose. The degree of oligomerization x, which indicates the distribution of monoglycosides and oligoglycosides, is a number of 1 to 10 and preferably assumes a value of 1.2 to 1.4.

Another class of preferred nonionic surfactants which are used either as sole nonionic surfactant or in combination with other nonionic surfactants, more particularly together with alkoxylated fatty alcohols, are alkoxylated and preferably ethoxylated or ethoxylated and propoxylated fatty acid alkyl esters, preferably containing 1 to 4 carbon atoms in the alkyl chain, more particularly the fatty acid methyl esters which are described, for example, in Japanese patent application JP 58/217 598 or which are preferably produced by the process described in International patent application WO-A-90/13533.

Nonionic surfactants of the amine oxide type, for example N-cocoalkyl-N,N-dimethylamine oxide and N-tallow alkyl-N,N-dihydroxyethylamine oxide, and the fatty acid alkanolamide type are also suitable. The quantity in which these nonionic surfactants are used is preferably no more than the quantity and, more preferably, no more than half the quantity of ethoxylated fatty alcohols.

Other suitable surfactants are polyhydroxyfatty acid amides corresponding to formula (II):

in which $R^2CO$ is an aliphatic acyl radical containing 6 to 22 carbon atoms, $R^3$ is hydrogen, an alkyl or hydroxyalkyl radical containing 1 to 4 carbon atoms and (Z) is a linear or branched polyhydroxyalkyl radical containing 3 to 10 carbon atoms and 3 to 10 hydroxyl groups. The polyhydroxyfatty acid amides are known substances which may normally be obtained by reductive amination of a reducing sugar with ammonia, an alkylamine or alkanolamine and subsequent acylation with a fatty acid, a fatty acid alkyl ester or a fatty acid chloride. The polyhydroxyfatty acid amides are preferably derived from sugars containing 5 or 6 carbon atoms. The preferred polyhydroxyfatty acid amides are therefore fatty acid N-alkylglucamides.

The detergents or cleaning compositions preferably contain 15 to 35% by weight of anionic and nonionic surfactants, the ratios by weight between the anionic and nonionic surfactants generally being 10:1 to 1:5.

In addition, the detergents or cleaning compositions according to the invention may contain around 15 to 45% by weight of other typical ingredients of detergents or cleaning compositions, including for example redeposition inhibitors (soil suspending agents), foam inhibitors, bleaching agents and bleach activators, optical brighteners, enzymes, fabric softeners, dyes and fragrances and also neutral salts.

Among the compounds yielding $H_2O_2$ in water which serve as bleaching agents, sodium perborate tetrahydrate and sodium perborate monohydrate are of particular importance. Other useful bleaching agents are, for example, peroxycarbonate, peroxypyrophosphates, citrate perhydrates and $H_2O_2$-yielding peracidic salts or peracids, such as perbenzoates, peroxophthalates, diperazelaic acid or diperdodecanedioic acid. The content of bleaching agents in the detergents or cleaning compositions is preferably from 5 to 25% by weight and more preferably from 10 to 20% by weight, perborate monohydrate advantageously being used.

In order to obtain an improved bleaching effect where washing is carried out at temperatures of 60° C. or lower, bleach activators may be incorporated in the preparations. Examples of suitable bleach activators are N-acyl or O-acyl compounds which form organic peracids with $H_2O_2$, preferably N,N'-tetraacylated diamines, such as N,N,N',N'-tetraacetyl ethylenediamine, and also carboxylic anhydrides and esters of polyols, such as glucose pentaacetate. Other known bleach activators are acetylated mixtures of sorbitol and mannitol of the type described, for example, in EP-A-0 525 239. The content of bleach activator in the bleach-containing detergents or cleaning compositions is in the usual range, preferably from 1 to 10% by weight and, more preferably, from 3 to 8% by weight.

The function of redeposition inhibitors is to keep the soil detached from the fibers suspended in the liquor and thus to prevent redeposition. Suitable redeposition inhibitors are water-soluble, generally organic colloids such as, for example, the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc., may also be used. Polyvinyl pyrrolidone is also suitable. Carboxymethyl cellulose (Na salt), methyl cellulose, hydroxyalkyl cellulose and mixed ethers, such as methyl hydroxyethyl cellulose, methyl hydroxypropyl cellulose and mixtures thereof, and polyvinyl pyrrolidone, more particularly in quantities of 0.1 to 5% by weight, based on the detergent or cleaning composition, are preferably used.

The foaming power of the surfactants may be increased or reduced by combinations of suitable surfactants. A reduction can also be obtained by additions of non-surface-active organic substances. Reduced foaming power, which is desirable for machine washing, is often obtained by combining surfactants of various types, for example sulfates and/or sulfonates with nonionic surfactants and/or with soaps. In the case of soaps, the foam-suppressing effect increases with the degree of saturation and the C chain length of the fatty acid ester. Accordingly, suitable foam-inhibiting soaps are soaps of natural and synthetic origin which have a high percentage content of $C_{18-24}$ fatty acids. Suitable non-surface-active foam inhibitors are organopolysiloxanes and mixtures thereof with microfine, optionally silanized silica and paraffins, waxes, microcrystalline waxes and mixtures thereof with silanized silica or bis-stearyl ethylenediamide. Mixtures of various foam inhibitors, for example mixtures of silicones and paraffins or waxes, may also be used with advantage. The foam inhibitors are preferably fixed to a granular water-soluble or water-dispersible support. Mixtures of paraffins and bis-stearyl ethylenediamide are particularly preferred.

The detergents may contain derivatives of diaminostilbene disulfonic acid or alkali metal salts thereof as optical brighteners. Suitable optical brighteners are, for example, salts of 4,4'-bis-(2-anilino-4-morpholino-1,3,5-triazin-6-ylamino)-stilbene-2,2'-disulfonic acid or compounds of similar structure containing a diethanol-amino group, a methylamino group, an anilino group or a 2-methoxyethylamino group instead of the morpholino group. Brighteners of the substituted 4,4'-distyryl diphenyl type, for example the compound 4,4'-bis-(4-chloro-3-sulfostyryl)-diphenyl, may also be present. Mixtures of the brighteners may also be used.

In another preferred embodiment of the invention, completely white granules are obtained if, in addition to the usual optical brighteners in the usual quantities, for example between 0.1 and 0.5% by weight and preferably around 0.1 to 0.3% by weight, the detergents or cleaning compositions also contain small quantities, for example $10^{-6}$ to $10^{-3}$% by weight and preferably around $10^{-5}$% by weight, of a blue dye. A particularly preferred dye is Tinolux® (a product of Ciba-Geigy).

Suitable enzymes are those from the class of proteases, lipases, amylases, cellulases and mixtures thereof. Enzymes obtained from bacterial strains or fungi, such as *Bacillus subtilis*, *Bacillus licheniformis* and *Streptomyces griseus*, are particularly suitable. Proteases of the subtilisin type and, more particularly, proteases obtained from *Bacillus lentus* are preferably used. Enzyme mixtures, for example of protease and amylase or protease and lipass or protease and cellulase or of cellulase and lipass or of protease, amylase and lipass or protease, lipass and cellulase, are of particular interest. Peroxidases or oxidases have also proved to be suitable in some cases. The enzymes may be adsorbed onto carriers and/or encapsulated in shell-forming substances to protect them against premature decomposition. The percentage content of enzymes, enzyme mixtures or enzyme granules may be, for example, from about 0.1 to 5% by weight and is preferably from 0.1 to about 2% by weight.

Suitable stabilizers, more particularly for per compounds and enzymes, are the salts of polyphosphonic acids, more particularly 1-hydroxyethane-1,1-diphosphonic acid (HEDP).

It is also possible to use proteases stabilized with soluble calcium salts (calcium content preferably around 1.2% by weight, based on the enzyme). However, it is of particular advantage to use boron compounds, for example boric acid, boron oxide, borax and other alkali metal borates, such as the salts of orthoboric acid ($H_3BO_3$), metaboric acid ($HBO_2$) and pyroboric acid (tetraboric acid $H_2B_4O_7$).

The preferably powder-form to granular detergents or cleaning compositions generally have an apparent density of 300 to 1200 g/l, preferably 500 to 1100 g/l and, more preferably above 600 g/l. Detergents or cleaning compositions with apparent densities above 500 g/l may additionally contain constituents which improve the solubility of the compacted granules. Corresponding constituents are described, for example, in earlier German patent applications P 41 24 701.9 and P 42 03 031.5. The constituents preferably used include, in particular, fatty alcohols containing 20 to 80 moles of ethylene oxide per mole of fatty alcohol, for example tallow fatty alcohol containing 30 EO and tallow fatty alcohol containing 40 EO, and also fatty alcohols containing 14 EO and polyethylene glycols with a relative molecular weight of 200 to 2,000.

The detergents or cleaning compositions may be produced by known methods, such as spray drying, mixing, granulation and/or extrusion. It is also possible to use a builder combination—containing a terpolymer of the monomers of a monoethylenically unsaturated $C_{3-8}$ carboxylic acid, a 2-alkyl allylsulfonic acid or 2-aryl allyl-sulfonic acid and a carbohydrate and/or the salts of a monoethylenically unsaturated $C_{3-8}$ carboxylic acid and of a 2-alkyl allylsulfonic acid or 2-aryl allylsulfonic acid and a carbohydrate—in the form of a compound designed for addition to other granular components of detergents or cleaning compositions. This builder combination may also be produced by mixing, granulation, extrusion and/or by spray drying, granulated or extruded compounds being preferred.

The present invention also relates to such builder combinations. They contain a terpolymer of the monomers of a monoethylenically unsaturated $C_{3-8}$ carboxylic acid, a 2-alkyl allylsulfonic acid or 2-aryl allylsulfonic acid and a carbohydrate and/or the salts of a monoethylenically unsaturated $C_{3-8}$ carboxylic acid and of a 2-alkyl allylsulfonic acid or 2-aryl allylsulfonic acid and a carbohydrate, preferably a terpolymer of the salts of the acids and a carbohydrate, as the copolymeric polycarboxylic acid and/or copolymeric polycarboxylate. Preferred builder combinations contain a terpolymer of which 40 to 60% by weight consists of (meth)acrylic acid or (meth)acrylate, preferably acrylic acid or acrylate, 10 to 30% by weight and preferably 15 to 25% by weight of methallylsulfonic acid or methallyl sulfonate and 15 to 40% by weight and preferably 20 to 40% by weight of a carbohydrate, preferably sucrose.

In another preferred embodiment, the builder combinations contain 50 to 70% by weight and preferably 55 to 65% by weight of zeolite and/or crystalline layer silicates, more particularly zeolite or zeolite and crystalline layer silicates in a ratio by weight of 1:1 or higher, and 1 to 30% by weight of terpolymer.

Other preferred builder combinations contain 5 to 30% by weight and preferably 5 to 25% by weight of sodium carbonate, 0 to 10% by weight and preferably 2 to 8% by weight of amorphous silicates, 0 to 8% by weight, preferably 0.5 to 5% by weight and more preferably up to 2% by weight of typical (co)polymeric acrylates and 0 to 25% by weight, preferably 2 to 20% by weight and, more preferably, 5 to 20% by weight of salts of organic polycarboxylic acids.

The builder combinations may additionally contain liquid to wax-like components, preferably nonionic surfactants. Corresponding builder combinations are preferably produced by spraying the builder combination with the liquid to wax-like components, more particularly with nonionic surfactants.

EXAMPLES

Granular detergents with the following composition (detergent according to the invention D1 and Comparison Example C1) were conventionally produced by spray drying and tested. In the case of D1, the terpolymer—which had been produced from 50% by weight of acrylic acid, 33% by weight of sucrose and 17% by weight of 2-methallylsulfonic acid in accordance with the disclosure of earlier German patent application P 42 21 381.9 and was then completely neutralized—and, in the case of C1, a polymeric polycarboxylate of an acrylate/maleate copolymer (Sokalan CP5®, a product of BASF, Federal Republic of Germany) was incorporated in the otherwise spray-dried product together with perborate, tetraacetyl ethylenediamine (TAED), enzyme granules containing protease and lipase and foam-inhibiting granules based on paraffin oil.

| Composition | (% by weight) |
|---|---|
| $C_{9-13}$ alkyl benzene sulfonate sodium salt | 9 |
| Tallow fatty alcohol sulfate | 4 |
| $C_{12-18}$ fatty alcohol · 5 EO | 4.3 |
| Tallow fatty alcohol · 5 EO | 1.8 |
| $C_{12-18}$ fatty acid soap sodium salt | 0.8 |
| Zeolite (anhydrous active substance) | 23.5 |
| Sodium carbonate | 12.6 |
| Sodium silicate ($Na_2O:SiO_2$ 1:2) | 3 |
| Perborate monohydrate | 16 |
| TAED | 5.5 |
| Carboxymethyl cellulose/methyl cellulose | 0.25 |
| Enzyme granules | 1 |
| Granular foam inhibitor | 0.2 |
| Optical brightener | 0.2 |
| Water | 11 |
| Salts of raw materials | Balance |
| Terpolymer or Sokalan CP5 ® | 5.5 |

Testing was carried out under simulated practical conditions in domestic washing machines. To this end, the machines were loaded with 3.5 kg of clean ballast washing and 0.5 kg of test fabrics, the test fabrics partly being impregnated with standard test soils for determining primary washing power and partly consisting of white fabrics for determining secondary washing power. Strips of standardized cotton cloth (Wäschereiforschungsanstalt krefeld, WFK), knitted fabrics (cotton tricot, B), grey cotton cloth (BN) and terry (FT) were used as the test fabrics.

Washing conditions:
  tap water with a hardness of 23° d (equivalent to 230 mg CaO/l), quantity of detergent used per detergent and machine 98 g,
  washing temperature 25° to 90° C. (heating time 60 minutes, 15 minutes at 90° C.)
  liquor ratio (kg of washing: liter of wash liquor in the main wash cycle) 1:5.7
  4× rinses with tap water, spin-drying, drying.

The primary washing powers of detergents D1 and C1 were comparable as expected.

The ash content of the textile samples was quantitatively determined after 25 wash cycles. The detergent D1 according to the invention produced results comparable with C1 on average over all the fabrics.

We claim:

1. In a detergent or cleaning composition, the improvement wherein the composition contains an incrustation inhibiting quantity in the amount from about 0.5 to about 30% by weight of the composition of at least one biodegradable terpolymer consisting of the monomer units of (a) from about 40 to about 60% by weight of at least one of a monoethylenically unsaturated $C_{3-8}$ monocarboxylic acid and a salt thereof, (b) from about 10 to about 30% by weight of at least one of a 2-alkyl or aryl allylsulfonic acid and a salt thereof, and (c) from about 15 to about 40% by weight of a carbohydrate and from about 10 to about 65% by weight of a water-containing zeolite, a crystalline layer silicate, or a mixture thereof.

2. The composition of claim 1 wherein component (a) is a $C_{3-4}$ acid, a salt thereof, or mixtures thereof.

3. The composition of claim 1 wherein component (b) is a 2-$C_{1-4}$ alkyl allylsulfonic acid or 2-phenyl allylsulfonic acid, a salt of the foregoing, or mixtures thereof.

4. The composition of claim 1 wherein component (c) is a mono-, di-, oligo-, or poly-saccharide.

5. The composition of claim 4 wherein component (c) is sucrose.

6. The composition of claim 1 wherein the terpolymer contains from about 45 to about 55% by weight of component (a), from about 15 to about 25% by weight of component (b), and from about 20 to about 40% by weight of component (c).

7. The composition of claim 1 wherein component (a) is (meth)acrylic acid or a salt thereof, component (b) is 2-methyl allylsulfonic acid or a salt thereof, and component (c) is a mono-, di-, or oligo-saccharide.

8. The composition of claim 1 wherein at least 50% of the acid groups of components (a) and (b) are in the form of their salts.

9. The composition of claim 8 wherein all of the acid groups are in the form of their sodium or potassium salts.

10. The composition of claim 1 wherein the at least one terpolymer is present in from about 2 to about 25% by weight.

11. The composition of claim 1 wherein the composition contains from about 3 to about 15% by weight of the at least one terpolymer, from about 20 to about 40% by weight of a zeolite, a crystalline layer silicate, or a mixture thereof, and from about 5 to about 15% by weight of sodium carbonate.

12. The composition of claim 1 which also contains a homopolymeric or copolymeric acrylate in a ratio by weight of terpolymer to acrylate of from about 2:3 to about 3:2.

13. The composition of claim 1 which also contains a salt of an organic polycarboxylic acid in a ratio by weight of terpolymer to said salt of from about 1:4 to about 4:1.

14. A builder composition comprising from about 1 to about 30% by weight of at least one biodegradable terpolymer consisting of the monomer units of (a) from about 40 to about 60% by weight of at least one of a monoethylenically unsaturated $C_{3-8}$ mono carboxylic acid and a salt thereof, (b) from about 10 to about 30% by weight of at least one of a 2-alkyl or aryl allylsulfonic acid and a salt thereof, and (c) from about 15 to about 40% by weight of a carbohydrate, and from about 50 to about 70% by weight of a zeolite, a crystalline layer silicate, or a mixture thereof.

15. The builder composition of claim 14 wherein in the terpolymer component (a) is a $C_{3-4}$ acid, salt thereof, or mixtures thereof, component (b) is a 2-$C_{1-4}$ alkyl allylsulfonic acid, 2-phenyl allylsulfonic acid, a salt of the foregoing, or mixtures thereof, and component (c) is a mono-, di-, or oligo-saccharide.

16. The builder composition of claim 14 which also contains from about 5 to about 30% by weight of sodium carbonate, from 0 to about 10% by weight of an amorphous silicate, from 0 to about 8% by weight of a (co) polymeric acrylate, and from 0 to about 25% by weight of a salt of an organic polycarboxylic acid.

* * * * *